（12）United States Patent
Callahan et al.

(10) Patent No.: US 10,293,293 B2
(45) Date of Patent: May 21, 2019

(54) RECIRCULATION FILTER FOR AN ELECTRONICS ENCLOSURE

(71) Applicant: Donaldson Company, Inc., Minneapolis, MN (US)

(72) Inventors: Ryan M. Callahan, Minneapolis, MN (US); Scott A. Keller, Savage, MN (US)

(73) Assignee: DONALDSON COMPANY, INC., Minneapolis, MN (US)

( * ) Notice: Subject to any disclaimer, the term of this patent is extended or adjusted under 35 U.S.C. 154(b) by 24 days.

(21) Appl. No.: 15/229,758

(22) Filed: Aug. 5, 2016

(65) Prior Publication Data

US 2017/0036151 A1    Feb. 9, 2017

Related U.S. Application Data

(60) Provisional application No. 62/201,491, filed on Aug. 5, 2015.

(51) Int. Cl.
| | |
|---|---|
| *G11B 33/14* | (2006.01) |
| *B01D 46/00* | (2006.01) |
| *B01D 39/08* | (2006.01) |
| *B01D 46/10* | (2006.01) |

(52) U.S. Cl.
CPC ....... *B01D 46/0032* (2013.01); *B01D 39/083* (2013.01); *B01D 46/103* (2013.01); *G11B 33/146* (2013.01); *B01D 2239/0435* (2013.01); *B01D 2239/0613* (2013.01); *B01D 2239/0672* (2013.01); *B01D 2275/10* (2013.01); *B01D 2279/45* (2013.01)

(58) Field of Classification Search
CPC .................................................. G11B 33/146
USPC ........................................................ 360/97.17
See application file for complete search history.

(56) References Cited

U.S. PATENT DOCUMENTS

| | | | | |
|---|---|---|---|---|
| 5,538,545 | A * | 7/1996 | Dauber | B01D 39/1692 55/385.6 |
| 6,296,691 | B1 * | 10/2001 | Gidumal | B01D 46/0032 360/99.16 |
| 7,166,142 | B2 * | 1/2007 | Tuma | B01D 53/0415 360/97.18 |

(Continued)

FOREIGN PATENT DOCUMENTS

| | | |
|---|---|---|
| CN | 104769676 | 7/2015 |
| JP | 2015531141 | 10/2015 |

(Continued)

*Primary Examiner* — Jefferson A Evans
(74) *Attorney, Agent, or Firm* — Mueting, Raasch & Gebhardt, P.A.

(57) ABSTRACT

One aspect of the technology relates to a recirculation filter. The recirculation filter has a first outer layer defining at least a portion of a first flow face of the recirculation filter, where the first flow face is configured to be positioned adjacent to a sensitive component in an electronics enclosure. A second outer layer defines at least a portion of a second flow face of the recirculation filter. A filter material layer is disposed between the first outer layer and the second outer layer. The filter material layer has a central region, wherein a substantial portion of the central region is offset from the first flow face of the recirculation filter. Other aspects are also described.

14 Claims, 4 Drawing Sheets

(56) References Cited

U.S. PATENT DOCUMENTS

| | | | | |
|---|---|---|---|---|
| 7,369,356 B2* | 5/2008 | Iwase | ............ | G11B 25/043 360/97.17 |
| 7,394,615 B2* | 7/2008 | Abe | ............ | B03C 3/155 360/97.18 |
| 7,986,490 B2* | 7/2011 | Hirono | ............ | G11B 25/043 360/97.22 |
| 8,254,055 B2* | 8/2012 | Brown | ............ | G11B 25/043 264/319 |
| 8,585,793 B2* | 11/2013 | Bishop | ............ | G11B 33/146 55/486 |
| 8,776,832 B2* | 7/2014 | Tuma | ............ | G11B 33/1466 137/549 |
| 8,885,291 B2 | 11/2014 | Miller et al. | | |
| 9,153,291 B2 | 10/2015 | Miller, III et al. | | |
| 10,115,436 B1* | 10/2018 | Zhang | ............ | G11B 33/146 |
| 2003/0202275 A1* | 10/2003 | Adams | ............ | G11B 33/14 360/97.17 |
| 2007/0283809 A1* | 12/2007 | Boulay | ............ | B03C 3/30 96/15 |
| 2008/0226534 A1* | 9/2008 | Gidumal | ............ | G11B 33/1453 423/416 |
| 2010/0086460 A1* | 4/2010 | Deeken | ............ | B01D 53/0415 423/245.1 |
| 2010/0118437 A1* | 5/2010 | Kong | ............ | G11B 25/043 360/97.16 |
| 2011/0089038 A1* | 4/2011 | Camalig | ............ | B01D 46/12 204/627 |
| 2012/0073253 A1* | 3/2012 | Bishop | ............ | G11B 33/146 55/495 |
| 2014/0030179 A1* | 1/2014 | Miller, III | ............ | G11B 33/146 423/245.1 |
| 2014/0043711 A1 | 2/2014 | Miller et al. | | |
| 2014/0377143 A1* | 12/2014 | Ellison | ............ | G11B 25/043 422/222 |
| 2015/0082985 A1 | 3/2015 | Miller et al. | | |
| 2015/0196924 A1 | 7/2015 | Miller et al. | | |
| 2017/0178695 A1* | 6/2017 | Miller, III | ............ | G11B 33/146 |
| 2017/0197163 A1* | 7/2017 | Tuma | ............ | B01D 39/1623 |
| 2017/0333820 A1* | 11/2017 | Tuma | ............ | G11B 33/1446 |
| 2018/0085693 A1* | 3/2018 | Nicklay | ............ | B01D 39/1623 |
| 2018/0111074 A1* | 4/2018 | Tuma | ............ | B01J 20/3223 |

FOREIGN PATENT DOCUMENTS

| | | |
|---|---|---|
| WO | 2014026175 | 2/2014 |
| WO | 2015123406 | 8/2015 |

* cited by examiner

RECIRCULATION FILTER FOR AN ELECTRONICS ENCLOSURE

This application is a non-provisional application claiming priority to U.S. Provisional Application No. 62/201,491, filed Aug. 5, 2015, and the entire contents of which is incorporated herein by reference.

FIELD OF THE TECHNOLOGY

The present application relates to a filter and method. More specifically, the present application relates to a recirculation filter for an electronics enclosure.

BACKGROUND

Some filters for electronics enclosures incorporate filter materials that can shed particulate material into the enclosure environment, which can be undesirable. The filters typically incorporate multiple layers of filter material that are welded together adjacent their outer perimeters. Attempts have been made to rectify the shedding issue by adding outer layers that are configured to contain the shed particulates within the filter assembly. In such attempts, the outer layers are layered against the outside surfaces of the filter material. The outer layers are generally coextensive with the outside surfaces of the filter material. The outer layers and the layers of filter material are then welded together in a weld area that is at, or adjacent to, the outer perimeter of the filter.

Figure 6:
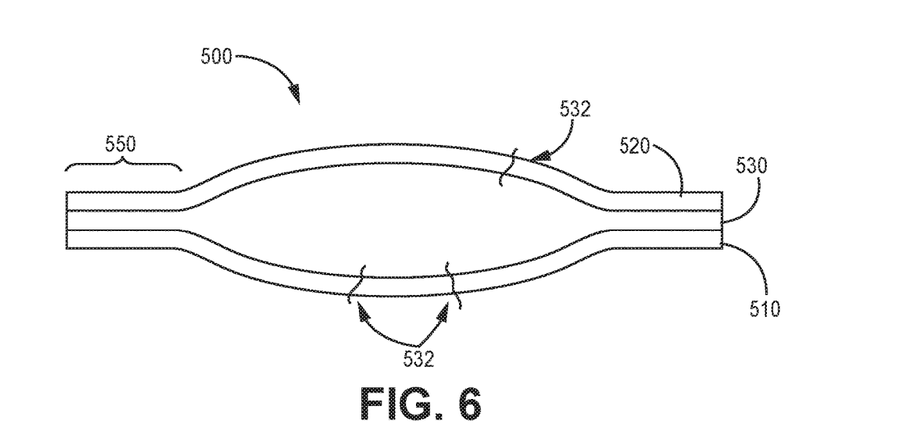
FIG. 6 is a cross-sectional view of an example recirculation filter that is known in the art.

FIG. 6 depicts an example recirculation filter 500 known in the art. The recirculation filter has outer scrim layers 510, 520 that contain a filter material layer 530. The outer scrim layers 510, 520 are welded to each other and the filter material layer 530 in a perimeter region 550 of the filter element 500.

It has been discovered that friction and other forces acting on the filter element 500 can partially dislodge and shift the ends of individual fibers 532 of the filter material layer 530 to protrude from the filter material layer 530 and extend beyond the outer layers 510, 520 of the filter element 500 that are configured to contain such fibers. Such forces can result from manufacturing the recirculation filter, from shipping the recirculation filter, and from handling the recirculation filter such as during manufacturing of an electronics enclosure—when the recirculation filter is being installed or inserted into the recirculation filter holder contained in the electronics enclosure—and during operation of the electronics enclosure, when the recirculation filter is in use. For example, the outer layers of the recirculation filter can rub against the filter material fibers, which can result in unwanted filter fibers shifting and extending into the electronics enclosure.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

In various embodiments, the technology disclosed herein relates to a recirculation filter that provides an offset distance between filter material fibers and sensitive components in electronics enclosures. In a variety of embodiments, the technology disclosed herein defines an offset between the fibers of filtration media and at least a first flow face of the recirculation filter. In a variety of embodiments, the technology disclosed herein defines an offset between the fibers of the filtration media and each of a first flow face and a second flow face of the recirculation filter.

Figure 1:
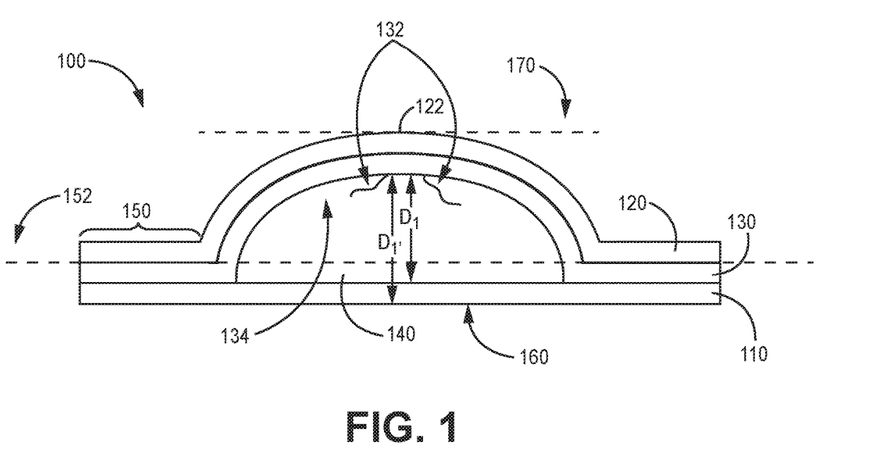
FIG. 1 is a cross-sectional view of an example recirculation filter consistent with the technology disclosed herein.

FIG. 1 depicts an example consistent with various embodiments of the current technology. A filter element 100 has a filter material layer 130 disposed between a first outer layer 110 and a second outer layer 120. The filter material layer 130, first outer layer 110, and second outer layer 120 are bonded together in a perimeter region 150. The first outer layer 110, second outer layer 120 and filter material layer 130 can be substantially coextensive, in some embodiments, where "substantially coextensive" is generally intended to mean that the layers have outer perimeters that are substantially the same shape and size, and that the outer perimeters are substantially aligned with each other.

The filter material layer 130 can be a variety of types of materials and combinations of materials. In some embodiments, the filter material 130 has multiple layers of materials, such as a filtration layer combined with another type of filtration layer and/or a support layer. Such a support layer can be a permeable scrim material having woven or nonwoven fibers, such as polypropylene fibers and/or polyester fibers. In some embodiments, the filter material layer 130 can contain or can have an adsorbent material disposed therein, such as activated carbon or silica gel. The adsorbent material can be configured as fibers, beads, or the like. In a variety of embodiments, the filter material 130 has electrostatic fibers. The term "electrostatic fibers," as used herein, refers to fibers that are electrostatically charged.

One advantage of including electrostatic fibers in the filter material 130 is that the filter is not only able to mechanically trap contaminants, but is also able to exert an electrostatic force on contaminants that contain electric charges, thereby increasing the amount of contaminants that are removed from the airstream. The electrostatic media can be triboelectric media, electret media, or any other media that is or can be charged, or that employs electrostatic filtration as a substantial mechanism for particle removal. In example embodiments, the electrostatic media has triboelectric fibers. Triboelectric fibers are known and can be formed, for example, using a mixture of (1) polyolefin fibers such as polyethylene, polypropylene or ethylene and propylene copolymers, with (2) fibers of another polymer, for example, fibers containing hydrocarbon functions substituted by halogen atoms, such as chlorine or polyacrylonitrile fibers. In general, the polyolefin fibers and the other polymer fibers are included in the electrostatic media at a weight ratio between about 60:40 or about 20:80 or about 30:70. In some embodiments the electrostatic media is completely or substantially constructed of a single material, where "substantially constructed of a single material" is intended to mean that at least 95% of the electrostatic media by mass is a single material.

In some embodiments, the filter material layer 130 primarily relies on mechanical filtration mechanisms rather than electric charge, such as impaction, interception, sieving, and/or diffusion. In such embodiments the filter material can substantially lack electrostatic fibers or can have a relatively small mass attributed to electrostatic fibers, where substantially lacking electrostatic fibers means that at least 95% of the mass of the filter material layer 130 is media other than electrostatic fibers. The filter material layer 130 has, for example, a permeability of between about 250 ft./min. at 0.5 inches of water and about 750 ft./min. at 0.5 inches of water. The filter material layer 130 can have a filtering efficiency of about 20% to about 99.99% for 0.1 to 0.3 micron particulate contaminants in some embodiments. Suitable filter material for the filter material layer 130 can, for example, have a filtering efficiency of greater than 20% for 0.1 to 0.3 micron particulate contaminants; greater than 40% for 0.1 to 0.3 micron particulate contaminants; or greater than 60% for 0.1 to 0.3 micron particulate contaminants. The filter material layer 130 can have in some example implementations a filtering efficiency of less than 99.99% for 0.1 to 0.3 micron particulate contaminants; less than 80% for 0.1 to 0.3 micron particulate contaminants; or less than 60% for 0.1 to 0.3 micron particulate contaminants. Filtering efficiency, as disclosed herein, is generally determined based on an airflow of 10.5 ft/min.

The filter element 100 has a first flow face 160 and a second flow face 170. The first outer layer 110 defines the first flow face 160 and the second outer layer 120 defines the second flow face 170, where a "flow face" is generally defined herein as a plane extending through the distal end of the filter element 100, where the plane is substantially perpendicular to the direction of airflow through the filter element 100, assuming straight-through airflow. Stated differently, the respective "flow face" is generally defined as the plane extending through the respective distal end of the filter element 100, where the plane is substantially parallel to the bonded perimeter region 150 of the filter element 100.

The distal end of an outer layer of a recirculation filter 100 is defined as the point or area on the layer having the furthest perpendicular distance from a plane 152 extending through the perimeter region 150. With respect to FIG. 1, since the first outer layer 110 is planar, the distal end of the first outer layer 110 can be considered the first outer layer 110 itself. The distal end 122 of the second outer layer 120 is the peak of the second outer layer 120 that has the furthest perpendicular distance from the plane 152 extending through the perimeter region 150. As such, the first outer layer 110 at least partially defines the first flow face 160 of the recirculation filter 100 and the second outer layer 120 at least partially defines the second flow face 170 of the recirculation filter 100.

The first outer layer 110 and the second outer layer 120 are generally configured to contain fibers of the filter material layer 130. The first outer layer 110 and the second outer layer 120 can be different materials, but in a variety of embodiments the first outer layer 110 and the second outer layer 120 are the same material. The first outer layer 110 and the second outer layer 120 are generally configured to be substantially non-shedding. In some embodiments the first outer layer 110 and the second outer layer 120 are constructed of a knit, woven, or non-woven scrim material such as polyester, polypropylene or polyethylene.

In some embodiments the first outer layer 110 and the second outer layer 120 are a woven polymer material. In some embodiments the first outer layer 110 and the second outer layer 120 are a woven polyester scrim having a yarn diameter of 50-90 microns and a yarn count of 110/inch-170/inch. In some embodiments the first outer layer 110 and the second outer layer 120 are a woven polyester scrim having a yarn diameter of 60-80 microns and a yarn count of 120/inch-160/inch. In some embodiments the first outer layer 110 and the second outer layer 120 are a woven polyester scrim having a permeability of 250-750 ft/min at 0.5 inches of water and a basis weight of about 50-100 and in some embodiments about 75 g/m². In some other embodiments the first outer layer 110 and the second outer layer 120 are constructed of a membrane material, such as polytetrafluoroethylene.

The first outer layer 110 and the second outer layer 120 can be constructed of a material that has, for example, a permeability of between about 100 ft./min. at 0.5 inches of water and about 800 ft./min. at 0.5 inches of water in some embodiments. In some embodiments the first outer layer 110 and the second outer layer 120 have a permeability of between about 250 ft./min. at 0.5 inches of water and about 600 ft./min. at 0.5 inches of water. In yet other implementations the first outer layer 110 and the second outer layer 120 have a permeability of between about 300 ft./min. at 0.5 inches of water and about 500 ft./min at 0.5 inches of water. It will be understood that suitable outer layers can have, for example, a permeability of more than 100 ft./min. at 0.5 inches of water; more than 250 ft./min. at 0.5 inches of water; or more than 300 ft./min. at 0.5 inches of water. Suitable outer layers can have, for example, a permeability of less than about 800 ft./min. at 0.5 inches of water in some embodiments; less than 600 ft./min. at 0.5 inches of water in some embodiments; or less than 500 ft./min. at 0.5 inches of water in some embodiments.

The first outer layer 110 generally defines the first flow face 160 of the filter element 100 and the second outer layer 120 generally defines the second flow face 170 of the filter element 100. The filter material layer 130 has a central region 134 that is surrounded by the perimeter region 150, where the central region 134 is generally offset from the first outer layer 110 of the filter element 100 by a maximum distance $D_1$. The maximum distance $D_1$ can range from about 0.15 mm to about 3.0 mm, and in some embodiments from about 0.2 mm to about 2.5 mm, and in some more particular embodiments from about 0.25 mm to about 2 mm. A substantial portion of the central region 134 is offset from the first flow face 160 of the filter element 100 by a maximum distance $D_1$. Furthermore, a substantial portion of the central region 134 is offset from a plane 152 passing through the perimeter region 150. As such, a void volume 140 is defined by the first outer layer 110 and the filter material layer 130. The void volume 140 can be an empty space that substantially lacks the presence of any material.

The thickness of the recirculation filter 100 is at least about 1.05 times the combined material thickness of the first outer layer 110, the second outer layer 120 and the filter material layer 130, where the thickness of the recirculation filter 100 is measured from the first flow face 160 to the second flow face 170 and the combined material thickness is measured with the component layers stacked vertically with the filter material layer disposed between the outer layers. In some embodiments the thickness of the recirculation filter 100 is at least about 1.08 times the combined material thickness of the first outer layer 110, the second outer layer 120 and the filter material layer 130. The thickness of the recirculation filter 100 can range from about 1.05 to about 10 times the combined material thickness of the component layers of the recirculation filter, which is the first outer layer 110, the second outer layer 120 and the filter material layer 130. In some embodiments the thickness of the recirculation filter 100 is from about 1.08 to about 9 times the combined material thickness of the components layers 110, 120, 130.

A substantial portion of the central region 134 of the filter material layer 130 does not contact the first outer layer 110, where a "substantial portion" is intended to mean at least 50%, at least 75%, at least 85% or at least 90%. As such, the void volume 140 limits the amount of friction that can occur between the first outer layer 110 and the filter material layer 130. The void volume 140 also offsets the filter material from the first flow face 160 of the filter element 100 to reduce the number of individual filter material fibers 132 of the filter material layer 130 that have ends that become dislodged and shifted to protrude beyond the first flow face 160 of the filter element 100.

The first outer layer 110 and the filter material 130 are generally formed to be concave relative to the first outer layer 110 to define the void volume 140. The first outer layer 110 and the filter material layer 130 can be formed through a variety of approaches, and in some embodiments, the first outer layer 110 and the filter material layer 130 are formed by compressing the layers 110, 130 between a nest and a horn to deform the layers to retain the concave configuration. The first outer layer 110 and the filter material layer 130 can be formed in accordance with technology disclosed in PCT Publication No. WO2014/026175 (Published on Feb. 13, 2014), which is incorporated herein by reference. In some embodiments, the shape of the filter material layer 130 can be maintained by a relatively rigid (relative to the filter material 130) and permeable support structure such as a mesh, which could be a wire mesh. In such embodiments the thickness of the wire mesh layer would be included in the determination of the combined material thickness of the component layers, described above. In multiple embodiments, the first outer layer 110 and the filter material layer 130 are generally unbonded except in the perimeter region 150. In some other embodiments, the first outer layer 110 and the filter material layer 130 can be bonded in the region central to the perimeter region 150, such as at discrete points. Such bonding will generally be limited such that airflow through the filter element is not substantially inhibited.

The first outer layer 110, second outer layer 120, and filter material layer 130 can be bonded in the perimeter region 150 through a variety of approaches. In some embodiments, the perimeter region 150 is formed through heat welding or ultrasonic welding, as examples. In such embodiments, the perimeter region 150 is relatively rigid compared to the first outer layer 110, second outer layer 120 and filter material layer 130. In such embodiments it will generally be understood that the combined thickness of each of the component layers 110, 120, 130 in the perimeter region 150 will be less than the combined thickness of the component layers 110, 120, 130 where the layers remain unbonded, such as in the region central to the perimeter region 150.

The filter element 100 is generally configured to have an efficiency of at least 50%, or in some embodiments at least 60% or even 65%, for 0.1 micron spherical particulate contaminants and a pressure drop of less than 0.10 inches $H_2O$ at an airflow of 10.5 ft/min.

Figure 2:
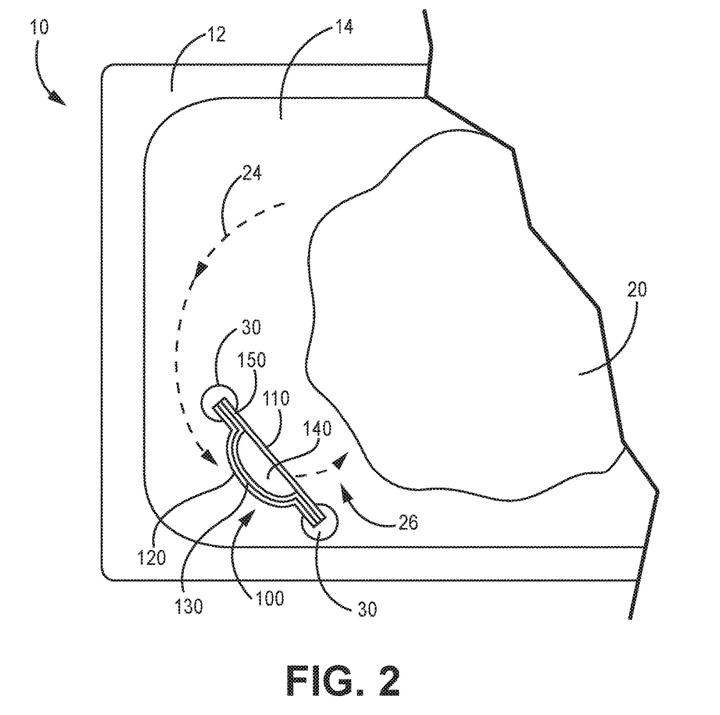
FIG. 2 is a schematic of a partial top plane view of an electronics enclosure containing a filter element consistent with the technology disclosed herein.

FIG. 2 is a simplified representation of an example implementation of the technology disclosed herein. A filter element 100 is installed in an electronics device 10 having a sensitive component 20. The electronics device 10 has an enclosure 12 that defines a cavity 14. As defined herein, a sensitive component is generally defined as a component positioned in an electronics device that can be negatively impacted by making contact with fibers from the filter material layer, such as by lessening the effectiveness of the component or the electronics device 10 or otherwise degrading the component or the electronics device 10. One example of a sensitive component is a disk where the electronics device is a disk drive. Another example of a sensitive component is a lens or bulb where the electronics device is a projector.

The filter element 100 has a first outer layer 110, a second outer layer 120, and a filter material layer 130 that are joined together in a perimeter region 150, as described with reference to FIG. 1. The filter element 100 is oriented to face an air stream 24 that is configured to be generated within the electronic device 10. The electronic device 10 has a filter mount 30 that is configured to receive the filter element 100. The filter mount 30 generally is configured to receive a portion of the perimeter region 150 of the filter element 100.

The first outer layer 110 defines the first flow face 160 of the filter element 100 and the second outer layer 120 defines the second flow face 170 of the filter element 100 (see FIG. 1). The first flow face 160 is configured to be positioned adjacent to the sensitive component 20 in the enclosure 12, meaning that the first flow face 160 and the sensitive component 20 are in relatively close proximity without intervening components or layers. The first flow face 160 can be configured to be less than 5 mm from the sensitive component 20 in various embodiments, less than 3 mm from the sensitive component 20 in some of those embodiments, and even less than 2 mm from the sensitive component 20 in some embodiments.

The filter material layer 130 is configured to be offset away from the first flow face 160 of the filter element such that a void volume 140 is defined by and between the first outer layer 110 and the filter material layer 130. It can be desirable to offset the filter material layer 130 away from the first flow face 160 of the filter element 100 to reduce the probability that the ends of filter material fibers 132 (see FIG. 1) of the filter material layer 130 will become partially dislodged from the filter material 130 and protrude through the first outer layer 110 towards the sensitive component 20.

Because the first outer layer 110 is configured to be positioned relatively close to the sensitive component 20, it can be desirable to conduct an inspection of the first outer layer 110 to ensure that no filter material fibers 132 (FIG. 1) are protruding there-through. Generally, filter media fibers protruding through the first outer layer 110 can be considered a part failure. In some implementations, a filter material fibers protruding through the first outer layer 110 past a maximum distance can be considered to be a part failure, where the maximum distance is about 1 mm in some embodiments, and 0.5 mm in other embodiments.

Figure 3:
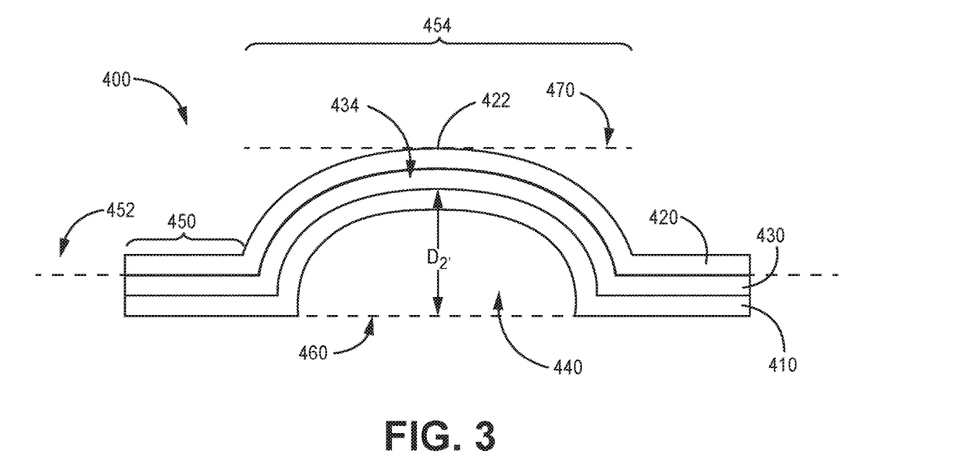
FIG. 3 is a cross-sectional view of another example recirculation filter consistent with the technology disclosed herein.

FIG. 3 depicts an alternate filter element 400 consistent with some embodiments of the currently-described technology. The components depicted and described in association with FIG. 3 can be constructed of the materials described with reference to FIG. 1. The filter element 400 has a first outer layer 410, a filter material layer 430, and a second outer layer 420 that are bonded in a perimeter region 450 and that are substantially unbonded in a central region 454 that is central to the perimeter region 450.

The filter material layer 430 abuts each of the first outer layer 410 and the second outer layer 420. The first outer layer 410, the filter material layer 430 and the second outer layer 420 are concave in shape. The first outer layer defines a void volume 440 that is surrounded by the perimeter region 450. The filter material layer 430 abuts each of the first outer layer 410 and the second outer layer 420. The perimeter region 450, and particularly the first outer layer 410 in the perimeter region 450, is the distal end of the first outer layer 410 that defines a first flow face 460 of the filter element 400, where the first flow face 460 abuts the void volume 440. A distal end 422 of the second outer layer 420 defines the location of a second flow face 470 of the recirculation filter 400.

The filter material layer 430 defines a central region 434 that is offset away from the first flow face 460 of the filter element 400 by a maximum offset distance $D_{2'}$, where the offset distance $D_{2'}$, can be similar to the offset distance $D_{1'}$, described above with reference to FIG. 1. At least a portion of the central region 434 of the filter material layer 430 is also offset from a plane 452 defined by the perimeter region 450. Such an offset reduces the probability that the ends of fibers forming the filter material layer 430 will become dislodged and translate to protrude past the first flow face 460 of the filter element 400.

Figure 4:
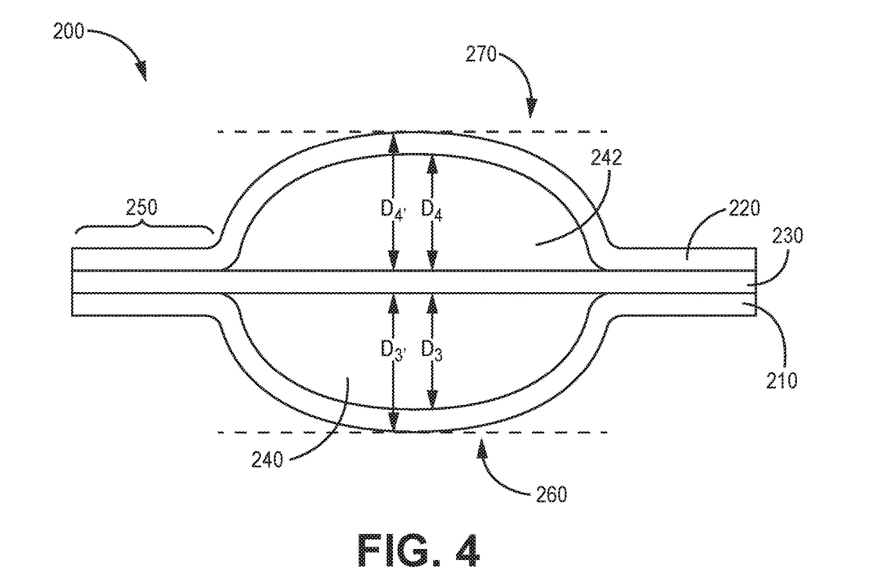
FIG. 4 is a cross-sectional view of another example recirculation filter consistent with the technology disclosed herein.

FIG. 4 depicts an alternate filter element 200 consistent with some embodiments of the present technology. The components depicted and described in association with FIG. 4 can be constructed of materials described herein with reference to FIG. 1. The filter element 200 has a first outer layer 210, a filter material layer 230, and a second outer layer 220 that are bonded in a perimeter region 250. The filter material layer 230 is substantially planar and disposed between the first outer layer 210 and the second outer layer 220.

The first outer layer 210 is concave relative to the filter material layer 230 to define a first void volume 240 between the filter material layer 230 and the first outer layer 210. The second outer layer 220 is concave relative to the filter material layer 230 to define a second void volume 242 between the filter material layer 230 and the second outer layer 220. As such, the filter material layer 230 is offset from the first outer layer 210 by first offset distance $D_3$ and the filter material layer 230 is offset away from the second outer layer 220 by second offset distance $D_4$. The offset distances $D_3$, $D_4$ can be the same distance or different distances. The offset distances $D_3$, $D_4$ can range from about 0.15 mm to about 3.0 mm or from about 0.2 mm to about 2.5 mm. Similarly, the filter material layer 230 is offset from the first flow face 260 of the filter element 200 by an offset distance $D_{3'}$, and offset from the second flow face 270 of the filter element 200 by an offset distance $D_{4'}$, where is the distances $D_{3'}$, and $D_{4'}$, incorporate the thickness of respective outer layers 210, 220. The thickness of the presently-described filter element 200 is at least 1.05 times, or at least 1.08 times, the combined material thickness of the first outer layer 210, the second outer layer 220 and the filter material layer 230.

In the currently-depicted configuration, each of the first outer layer 210 and the second outer layer 220 can be configured to be positioned adjacent to a sensitive component in an electronics enclosure. The void volumes 240, 242 reduce the probability that the ends of the fibers within the filter material layer 230 will become dislodged from the filter material layer 230 and translate to protrude past each of the first outer layer 210, the first flow face 260, the second outer layer 220, and the second flow face 270 towards the sensitive component. The void volumes also reduce friction between the filter material layer 230 and each of the first outer layer 210 and the second outer layer 220.

Figure 5:
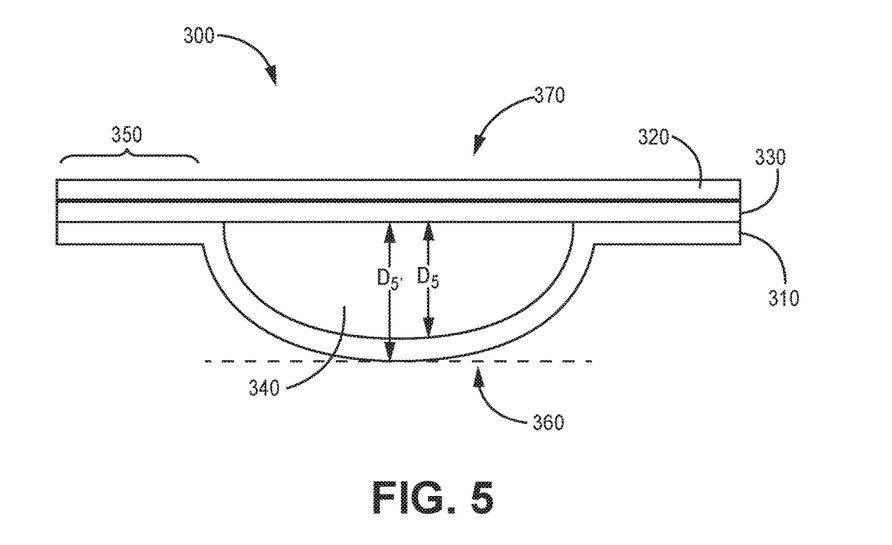
FIG. 5 is a cross-sectional view of another example recirculation filter consistent with the technology disclosed herein.

FIG. 5 depicts an alternate filter element 300 consistent with some embodiments of the present technology. The components depicted and described in association with FIG. 5 can be constructed of materials described with reference to FIG. 1. The filter element 300 has a first outer layer 310, a filter material layer 330, and a second outer layer 320 that are bonded in a perimeter region 350. The filter material layer 330 is substantially planar and disposed between the first outer layer 310 and the second outer layer 320.

The second outer layer 320 is substantially planar and abuts the filter material layer 330. The first outer layer 310 is concave relative to the filter material layer 330 to define a void volume 340 between the filter material layer 330 and the first outer layer 310. As such, the filter material layer 330 is offset away from the first outer layer 310 by an offset distance $D_5$, and the filter material layer 330 is offset away from the first flow face 360 of the filter element 300 by an offset distance $D_{5'}$. The void volume 340 reduces the probability that the ends of fibers from the filter material layer 330 will become dislodged from the filter material layer 330 and extend through the void volume 340 to protrude past the first outer layer 310. The void volume 340 also reduces friction between the filter material layer 330 and the first outer layer 310. The maximum distance $D_5$ can range from about 0.15 mm to about 3.0 mm, and in some embodiments from about 0.2 mm to about 2.5 mm, and in some more particular embodiments from about 0.25 mm to about 2 mm. The ratio of the thickness of the filter element 300 relative to the combined thicknesses of the component layers 310, 320, 330 can be similar to that described above with reference to FIG. 1.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A recirculation filter comprising:
   a first outer layer having a distal end defining the location of a first flow face of the recirculation filter;
   a second outer layer having a distal end defining a second flow face of the recirculation filter; and
   a filter material layer disposed between the first outer layer and the second outer layer, wherein the first outer layer, second outer layer, and filter material layer are bonded in a perimeter region defining a plane at the first flow face, wherein a substantial portion of a central region of the filter material layer is offset from the first flow face, wherein the ratio of the thickness of the recirculation filter to the combined material thickness of the first outer layer, the second outer layer, and the filter material layer is from about 1.05 to about 10, wherein the filter material layer is an electrostatic material, and wherein the first outer layer, the second outer layer and the filter material layer are concave relative to the first flow face.

2. The recirculation filter of claim 1, wherein the filter material layer defines a central region and wherein a substantial portion of the central region does not contact the first outer layer.

3. The recirculation filter of claim 1, wherein a first void volume is defined by the first outer layer and the filter material layer.

4. The recirculation filter of claim 3, further defining a second void volume defined by the second outer layer and the filter material layer.

5. The recirculation filter of claim 1, wherein the filter material layer abuts each of the first outer layer and the second outer layer.

6. The recirculation filter of claim 1, wherein each of the first outer layer and the second outer layer are concave relative to the filter material layer.

7. The recirculation filter of claim 1, wherein the filter material layer abuts the second outer layer.

8. The recirculation filter of claim 1, wherein the first outer layer and the second outer layer each comprise a woven scrim.

9. The recirculation filter of claim 1, wherein the first outer layer and the second outer layer each comprise a woven polymer scrim.

10. The recirculation filter of claim 1, wherein the first outer layer and the second outer layer each comprise a woven polyester scrim.

11. The recirculation filter of claim 1, wherein the first flow face is configured to be positioned adjacent to a sensitive component in an electronics enclosure.

12. An electronic device comprising:
an enclosure defining a cavity;
a sensitive component disposed within the cavity;
a filter mount disposed in the cavity; and
a recirculation filter comprising:
  a first outer layer having a distal end defining the location of a first flow face of the recirculation filter;
  a second outer layer having a distal end defining a second flow face of the recirculation filter; and
  a filter material layer comprising an electrostatic material disposed between the first outer layer and the second outer layer, wherein the first outer layer, second outer layer, and filter material layer are bonded in a perimeter region defining a plane at the first flow face, wherein a substantial portion of a central region of the filter material layer is offset from the first flow face, wherein the ratio of the thickness of the recirculation filter to the combined material thickness of the first outer layer, the second outer layer, and the filter material layer is from about 1.05 to about 10, wherein the recirculation filter is received by the filter mount, and wherein the first flow face of the recirculation filter is positioned adjacent to the sensitive component, and wherein the first outer layer, the second outer layer and the filter material layer are concave relative to the first flow face.

13. The electronic device of claim 12, wherein the sensitive component is a disk and the electronic device is a disk drive.

14. The electronic device of claim 12, wherein the first flow face of the recirculation filter is less than 3 mm from the sensitive component.

* * * * *